June 3, 1924.

J. F. PANYARD

PISTON PACKING

Filed April 5, 1923

1,496,428

INVENTOR.
John F. Panyard.
BY Ralzemond A. Parker
ATTORNEY.

Patented June 3, 1924.

1,496,428

UNITED STATES PATENT OFFICE.

JOHN F. PANYARD, OF DETROIT, MICHIGAN.

PISTON PACKING.

Application filed April 5, 1923. Serial No. 629,993.

*To all whom it may concern:*

Be it known that I, JOHN F. PANYARD, a citizen of the United States, residing at Detroit, county of Wayne, State of Michigan, have invented a certain new and useful Improvement in Piston Packing, and declare the following to be a full, clear, and exact description of the same, such as will enable others skilled in the art to which it pertains to make and use the same, reference being had to the accompanying drawings, which form a part of this specification.

My invention relates to improvements in piston packing and to that class of packing in which one or more longitudinally-tapered ring sections are rotatably disposed within the groove in the piston and held under rotatable pressure to produce sideways expansion to seal the joint at the side walls of the grooves.

In piston packing it is desirable to provide a ring construction which will not only retain the compression in the cylinder and prevent oil pumping with the exertion of a minimum of pressure against the cylinder wall, but also a packing construction which will quickly and with substantial accuracy seat itself in the groove in the piston and which seating will be assisted by the pressure exerted by the linder wall.

In the quantity production of pistons and piston packing now made necessary, it is impossible to secure perfect uniformity of construction or absolute accuracy of dimension. The packing, however, must make up for these variations from the set standard. In addition, wear of the moving parts produces inequalities and irregularities, which, in so far as it is possible to attain, the packing must compensate.

I provide a packing ring with a beveled face tapered lengthwise of the ring. In the preferred specific embodiment illustrated two ring sections are employed which have oppositely-disposed longitudinally-tapered beveled meeting faces. Rotation of one ring section relative the other counter the taper thereof produces a perfect seal at the side walls of the groove. The compression exerted by the cylinder wall assists in adjusting the packing in the groove as well as forming a seal therewith. Absolute accuracy of dimension and perfection of fit between the meeting sections of the packing is not so imperatively essential as there is a tendency on the part of the separate sections of the packing to naturally seek a seat in the groove and with each other irrespective of slight differences or variations from a standard size and notwithstanding resulting wear of the moving parts. The separate sections of the packing quickly and with substantial accuracy adjust themselves to a seat in the groove and seal the joint formed at the side walls thereof and with the cylinder wall, and wear of the packing in the cylinder wall and the groove in the piston is met by self-adjustment of the packing to the new condition.

Another important feature of construction is the employment of one or more spring members secured to the inner face of one of the packing ring sections and adapted to engage the bottom of the groove to urge said ring section rotatably in a direction to wedge the same against the side wall of the groove and to prevent reverse rotation of such ring section. These springs may preferably be spot-welded to the ring section. This permits packing to be quickly and easily assembled in the groove in the piston.

In the drawings,—

Figure 1:
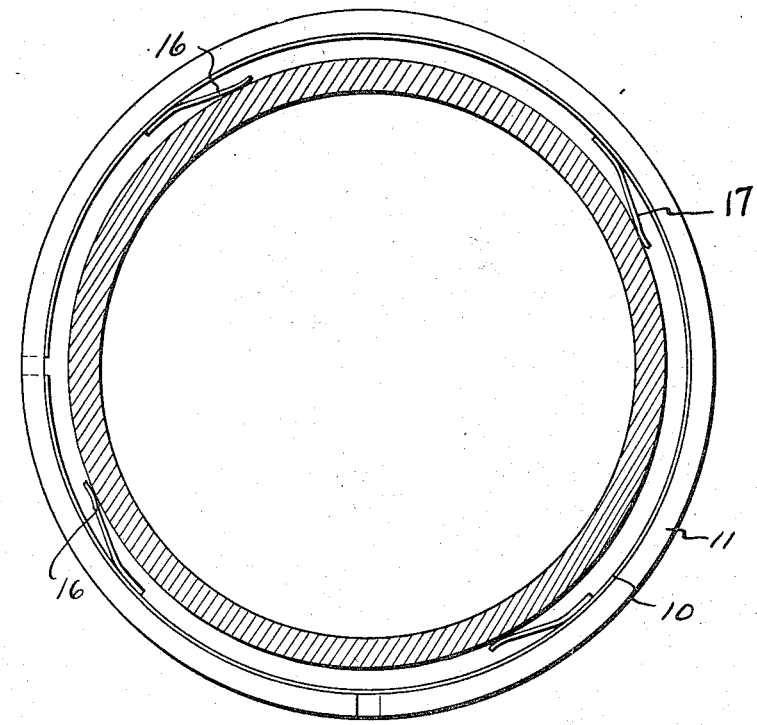
Figure 1 is a horizontal section through a piston showing my improved packing in position in the groove.
Figure 3:
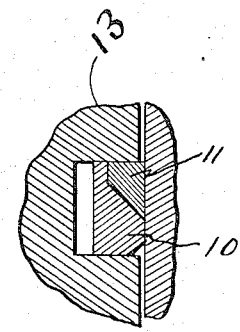
Fig. 3 is a fragmentary sectional view through the packing showing the same within the groove of a piston.
Figure 2:
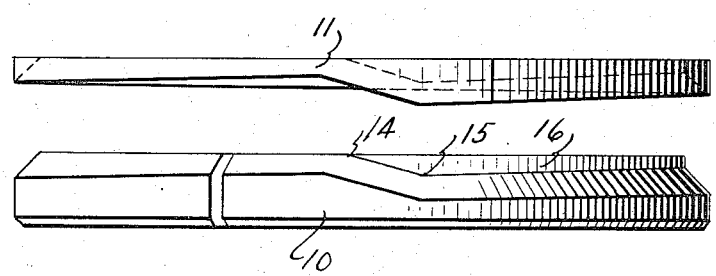
Fig. 2 is a side elevation of my improved packing showing the ring sections separated.
Figure 4:
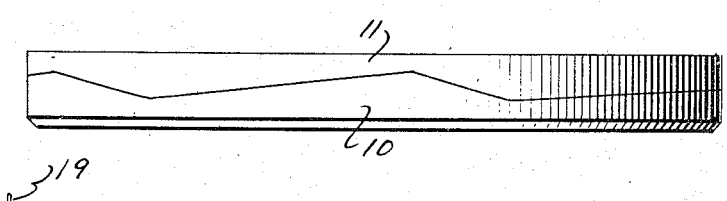
Fig. 4 is a side elevation of a modified form of my packing.

My invention as illustrated in the drawing consists of a single pair of split ring sections 10 and 11 disposed side by side in the groove 12 in the piston 13. These ring sections have beveled meeting faces oppositely longitudinally tapered to provide each ring section with a single helical lateral surface to contact a helical meeting face of the cooperating ring section so that relative rotation of the sections counter the taper produces axial expansion of the packing within the groove. I have found a single pair of ring sections to be a particularly suitable packing though a greater number of sections might be employed if found desirable. Also I prefer to so form the meeting faces as to provide a single tapered face on each ring section. However, as shown in Fig. 4, a plurality of inclined faces might be employed to accomplish the same purpose.

In the construction I prefer to employ the ring section 10 is considerably larger in cross-sectional area than ring section 11. The large section 10 seats in the bottom of the groove and substantially fills the gap of the groove. The small section 11 is arranged between the beveled face of the large section and the opposite side wall of the groove. The beveled face of the large section tapers from the lateral wall of the section as at 14 circumferentially, the section to a point 15 interior thereof, providing a tapering base flange 16 which is encircled by the small ring section 11.

Springs of various kinds may be employed to exert rotatable pressure on one or both of the ring sections to produce relative rotation counter the taper to expand the packing axially within the groove, but an important feature of construction is to provide a suitable number of small spring members 17 fixed to the inner circumference of the large ring section and adapted to bear against the bottom of the groove to exert rotatable pressure on the ring section which carries the spring members. Each spring member is so shaped as to exert a forward pressure on the ring section rotatably within the groove and prevent reverse rotation of the section within the groove against the spring.

A convenient method of attaching the spring to a ring section is to spot-weld one end of the spring to the ring. In such a construction the packing may be very conveniently assembled within the groove as the large section carries the expanding springs.

Figure 5:
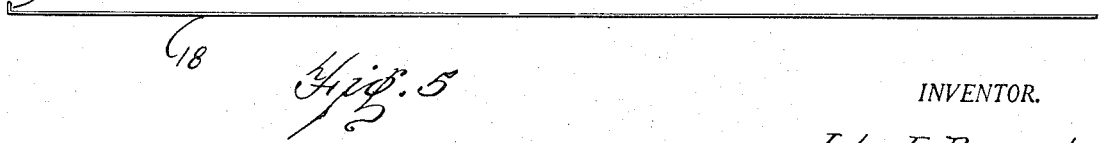
Fig. 5 is a side elevation of a suitable spring for use in connection with my packing.

Another form of spring is illustrated in Fig. 5. This comprises a spring 18 adapted to be coiled about the piston in the bottom of the groove, which spring is turned up at the end 19 to engage in the split in the ring to exert rotatable pressure thereon.

The helical surfaces of the ring sections are beveled. There is, therefore, a constant tendency on the part of the co-operating sections of the ring to seat easily with each other as they are held under constriction by the cylinder wall. It will be seen that irrespective of the type of spring employed the tendency will be to urge the impelled section rotatably within the groove counter the taper of the co-operating section and produce axial expansion of the packing against the respective side walls of the groove. The free ring section 11, by virtue of its frictional engagement with the impelled section 10, will likewise be urged in the same direction within the groove as the section held under constraint of the spring.

A satisfactory result, however, would be obtained were the small section 11 held against rotation within the groove but axially movable therein, as appears from my co-pending application Serial No. 629,992 this day filed.

What I claim is:

1. In piston packing, in combination with a piston having an annular groove for packing, packing in said groove consisting of a plurality of ring sections having beveled meeting faces oppositely longitudinally tapered so that rotation of one ring section in a given direction relative the other section tends to increase the combined axial dimension of the ring sections.

2. In piston packing, in combination with a piston having an annular groove for packing, packing in said groove consisting of a ring section disposed within the groove and having a beveled face tapered lengthwise the ring, a second ring section rotatably disposed within the groove between the beveled face of the first ring section and the opposite side wall of the groove and having a beveled face contacting the beveled face of the first ring section and oppositely longitudinally tapered, and means for exerting yielding rotatable pressure on said second ring section.

3. In piston packing, in combination with a piston having an annular groove for packing, packing in said groove consisting of a pair of ring sections having oppositely-disposed longitudinally-tapered beveled meeting faces, each of said ring sections being rotatable within the groove, and a spring engaging one of said ring sections to produce rotation thereof to increase the combined axial width of said ring sections.

4. In piston packing, in combination with a piston having an annular groove for packing, packing in said groove comprising a plurality of split ring sections rotatably disposed within the groove and having longitudinally-tapered beveled meeting faces, said ring sections so arranged within the groove that rotation of one section counter the taper of the other tends to expand the combined sections axially within the groove, and a spring arranged in the groove underneath one of said sections engaging the same to produce rotation thereof counter the taper of the other section.

5. In piston packing, in combination with a piston having an annular groove for packing, packing in said groove consisting of a plurality of ring sections having longitudinally-tapered beveled meeting faces, and a spring member secured to the under surface of one of said ring sections and adapted to engage the piston to prevent the rotation of the ring section in one direction.

6. In piston packing, in combination with a piston having an annular groove for packing, packing in said groove consisting of a plurality of ring sections having beveled meeting faces tapered lengthwise and oppositely disposed so that rotation of one section relative the other and counter the taper thereof tends to increase the combined axial dimension of the ring sections, and a spring member securely fastened at one end to the inner surface of one of said ring sections and adapted to engage the bottom of the groove in the piston to urge said ring section rotatably within the groove in a given direction and prevent reverse rotation thereof.

7. In piston packing, in combination with a piston having an annular groove for packing, packing in said groove consisting of a large ring section having a base substantially the width of the bottom of the groove and a beveled face tapered lengthwise the section disposed opposite the side wall of the groove, a small ring section disposed between the beveled face of the large ring section and the opposite side wall of the groove and provided with a beveled face contacting the beveled face of the large ring section and tapered lengthwise counter the taper of the large ring section, and means for exerting rotatable pressure on one of said ring sections relative the other.

8. In piston packing, in combination with a piston having an annular groove for packing, a piston ring rotatably disposed within said groove having a beveled face tapered lengthwise the ring co-acting with an opposed beveled face oppositely tapered so that rotation of the ring counter the taper of the co-acting face wedges the ring axially within the groove, and yielding means to exert rotatable pressure on said ring.

In testimony whereof, I sign this specification.

JOHN F. PANYARD.